US 9,335,201 B2

(12) United States Patent
Huang et al.

(10) Patent No.: US 9,335,201 B2
(45) Date of Patent: May 10, 2016

(54) LIQUID LEVEL MEASURING DEVICE

(71) Applicant: National Applied Research Laboratories, Hsinchu (TW)

(72) Inventors: Chun-Ming Huang, Hsinchu (TW); Wei-Chang Tsai, Hsinchu (TW); Chen-Chia Chen, Hsinchu (TW)

(73) Assignee: NATIONAL APPLIED RESEARCH LABORATORIES, Hsinchu (TW)

( * ) Notice: Subject to any disclaimer, the term of this patent is extended or adjusted under 35 U.S.C. 154(b) by 255 days.

(21) Appl. No.: 14/140,284

(22) Filed: Dec. 24, 2013

(65) Prior Publication Data
US 2015/0153214 A1 Jun. 4, 2015

(30) Foreign Application Priority Data
Dec. 2, 2013 (TW) .............................. 102144104 A

(51) Int. Cl.
*G01F 23/76* (2006.01)
*G01F 23/74* (2006.01)

(52) U.S. Cl.
CPC ................ *G01F 23/76* (2013.01); *G01F 23/74* (2013.01)

(58) Field of Classification Search
CPC .......... G01F 23/72; G01F 23/74; G01F 23/76
USPC .......................................................... 73/305
See application file for complete search history.

(56) References Cited

U.S. PATENT DOCUMENTS

| 4,748,299 | A  | * | 5/1988  | Custer   | H01H 36/02 200/84 C |
| 5,313,818 | A  | * | 5/1994  | Sayka    | H01L 21/6715 73/19.1 |
| 5,793,200 | A  | * | 8/1998  | Berrill  | G01D 5/145 324/207.12 |
| 6,028,521 | A  | * | 2/2000  | Issachar | G01F 23/62 340/618 |
| 6,253,611 | B1 | * | 7/2001  | Varga    | G01F 23/76 73/319 |
| 2005/0268715 | A1 | * | 12/2005 | Sabatino | G01F 23/74 73/313 |
| 2011/0138907 | A1 | * | 6/2011  | Rudd     | G01F 23/74 73/313 |

* cited by examiner

Primary Examiner — Laura Martin
Assistant Examiner — Jean Morello
(74) Attorney, Agent, or Firm — Hauptman Ham, LLP

(57) ABSTRACT

The present invention provides a liquid level measuring device which comprises: a tube for accommodating a liquid; a floating member disposed inside the tube, the floating member rising and falling as the level of the liquid varies; at least one magnetic detecting element fastened to the floating member, the magnetic detecting element floating along with the floating member; and a plurality of magnetic sources disposed outside the tube, which are distributed separately along the changing direction of the liquid level so as to establish a specific magnetic field strength distribution, wherein the magnetic detecting element detects the magnetic field strength at the height at which the magnetic detecting element is located and outputs a measuring signal correspondingly, and the liquid level is determined according to the measuring signal. The present invention has many advantages including low cost, efficiency, and it can easily be deployed in considerable amounts.

11 Claims, 6 Drawing Sheets

LIQUID LEVEL MEASURING DEVICE

TECHNICAL FIELD OF THE INVENTION

The present invention relates to a liquid level measuring device, and more particularly to a magnetic device for measuring the level of a liquid.

BACKGROUND OF THE INVENTION

Extreme weather events occur frequently as global warming raises the temperature of the earth. Rivers are often flooding, and the flooding becomes more and more serious in urban areas. Therefore, it is an urgent issue to monitor the water level of a river or a reservoir, or in an area which is easily flooded. In addition, water level or liquid level monitoring is required in other technical fields as well, for example, monitoring the level of a liquid or water for industrial use. The water level or liquid level measurement is very important in many fields. Therefore, it is necessary to develop a low-cost and efficient liquid level measuring device for serving the needs of these industries.

SUMMARY OF THE INVENTION

An objective of the present invention is to provide a liquid level measuring device which can measure the level of a liquid in a low-cost and efficient manner.

To achieve the above objective, the present invention provides a liquid level measuring device comprising: a tube for accommodating a liquid; a floating member disposed inside the tube, the floating member rising and falling as the level of the liquid in the tube varies; a magnetic detecting unit having at least one magnetic detecting element, the magnetic detecting element and the floating member being fastened to each other such that the magnetic detecting element floats along with the floating member; and a plurality of magnetic sources disposed outside the tube, the magnetic sources being distributed separately along the changing direction of the liquid level so as to establish a specific magnetic field strength distribution, wherein the magnetic detecting element detects the magnetic field strength at the level of the liquid where the magnetic detecting element is located and outputs a measuring signal correspondingly, and the liquid level is determined according to the measuring signal outputted by the magnetic detecting element.

In another aspect, the present invention provides a liquid level measuring device, comprising: a tube; a filter disposed at the bottom surface of the tube, a liquid entering the tube via the filter, the filter being used to filter solid matter existing in the liquid so as to prevent the solid matter from entering the tube; a floating member disposed inside the tube, the floating member rising and falling as the level of the liquid in the tube varies; at least two magnetic detecting elements configured to be apart from each other for a predetermined distance, the two magnetic detecting elements being fastened to the floating member such that the two magnetic detecting elements float along with the floating member; and a plurality of magnetic sources disposed on an external wall of the tube, in which the magnetic fields generated by the respective magnetic sources are not the same, the intervals between the magnetic sources are not the same as well, and the magnetic sources are distributed separately along the changing direction of the liquid level so as to establish a specific magnetic field strength distribution, wherein the two magnetic detecting elements respectively detect magnetic field strengths at their positions and output measuring signals correspondingly, and the liquid level is determined according to the measuring signals outputted by the two magnetic detecting elements.

The present invention can realize a liquid level measurement by using one or more magnetic detecting elements fastened to the floating member to detect the magnetic field strength distribution established by the magnetic sources. The liquid level measuring device of the present invention can be deployed in a river, a reservoir, or in an area which is easily flooded. Such a device can monitor the level of the liquid in real time and provide a steady and reliable liquid level measurement. In the present invention, the liquid level measuring device can also be used to monitor the level of a liquid or water for industrial use, and is applicable to other technical fields as well. Compared to conventional skills, the liquid level measuring device implemented in accordance with the present invention has many advantages including low cost, simplicity, and it can easily be deployed in considerable amounts.

DETAILED DESCRIPTION OF THE INVENTION

The present invention provides a liquid level measuring device which can be used to measure the level of a liquid or water for industrial use. Said device can provide a steady and long-term liquid level measurement. Moreover, according to the present invention, the liquid level measuring device can be deployed in a rapid river or stream, or in an area which is easily flooded. Said device can monitor the water level in real time and provide flood warnings or high water level warnings. In the present invention, by arranging a plurality of magnetic sources and at least one magnetic detecting unit used to detect or measure the magnetic field established by the magnetic sources, the liquid level measuring device realizes real-time liquid level monitoring. The present invention has advantages including low cost and easy deployabilty in considerable amounts.

Figure 1:
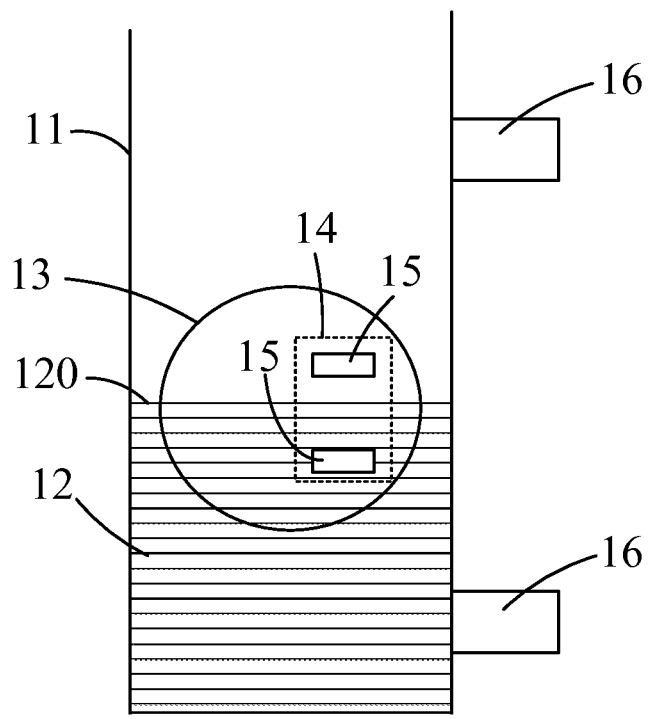
FIG. 1 shows a conceptual model of a liquid level measuring device in the present invention.

FIG. 1 shows a conceptual model of a liquid level measuring device 10 in the present invention. The liquid level measuring device 10 mainly comprises a tube 11, a floating member 13, a magnetic detecting unit 14, and a plurality of magnetic sources 16. The tube 11 can be a container for carrying water or a liquid 12. The liquid 12 may enter the tube 11 by various ways. The liquid level 120 rises up as the liquid 12 enters the tube 11 and the liquid level 120 falls down as the liquid 12 flows out of the tube 11. Alternatively, the law of communicating vessels may be utilized in the present invention. In such a manner, the level 120 of the liquid 12 inside the tube 11 is inconsistent with the level of the same liquid outside the tube 11. Meanwhile, the measured liquid level 120 is equal to the liquid level of the external liquid. The floating member 13 is disposed inside the tube 11. The floating member 13 rises and falls as the level 120 of the liquid 12 in the tube 11 varies. The floating member 13 can be made of wood, plastic, or a hollow nonferrous metal.

The magnetic detecting unit 14 has one or more magnetic detecting elements 15 (FIG. 1 shows two magnetic detecting elements 15). The magnetic detecting element 15 can be implemented by a Hall effect sensor. The magnetic detecting unit 14 and the floating member 13 are fastened to each other. In such a manner, the magnetic detecting unit 14 and the floating member 13 float as the liquid level 120 varies. The magnetic detecting element 15 can be disposed inside the floating member 13 and is sealed off from the liquid 12. Alternatively, the magnetic detecting element 15 also can be disposed on the external surface of the floating member 13 and is sealed off from the liquid 12 by a protective shell.

The plural magnetic sources 16 are permanent magnets or electromagnets capable of generating magnetic fields. The magnetic sources 16 are disposed outside the tube 11. These magnetic sources 16 can be directly fastened onto the external surface of the tube 11. Alternatively, these magnetic sources 16 can be fixed on a board (not shown), and then the board is fastened to the external surface of the tube 11. Accordingly, it is very convenient to select an appropriate set of magnetic sources and the magnetic field strength distribution corresponding thereto by replacing the board and the magnetic sources fastened thereto.

Basically, the plural magnetic sources 16 are distributed separately along the changing direction of the liquid level, i.e., along the direction the floating member 13 rises and falls. The magnetic sources 16 are substantially lined up along a straight line. In other embodiments, the magnetic sources 16 can also be arranged in a two-dimensional form and surround the tube 11. Also, the magnetic sources 16 can be arranged in a sawtooth pattern or other shapes as long as they are substantially lined up along a vertical direction.

In addition, in order to make the magnetic field strength detected at a certain liquid level keep stable, the horizontal movement or angular movement of the magnetic detecting unit 14 is restricted or prohibited such that the magnetic detecting unit 14 can only move along the direction in which the level of the liquid rises and falls (i.e., the vertical direction). This can be carried out by altering the sizes and shapes of the tube 11 and the floating member 13. For example, a square tube is adopted as the tube 11. The floating member 13 is a sphere. The four sides of the square tube in cross section are substantially consistent with the diameter of the sphere. Alternatively, the tube 11 and the floating member 13 have the same cross section shape such as a triangle, a quadrangle, star shaped, and other proper shapes. In addition, a restricting mechanism can be used to connect the floating member 13 to restrict the horizontal movement or rotation of the floating member 13.

Figure 2:
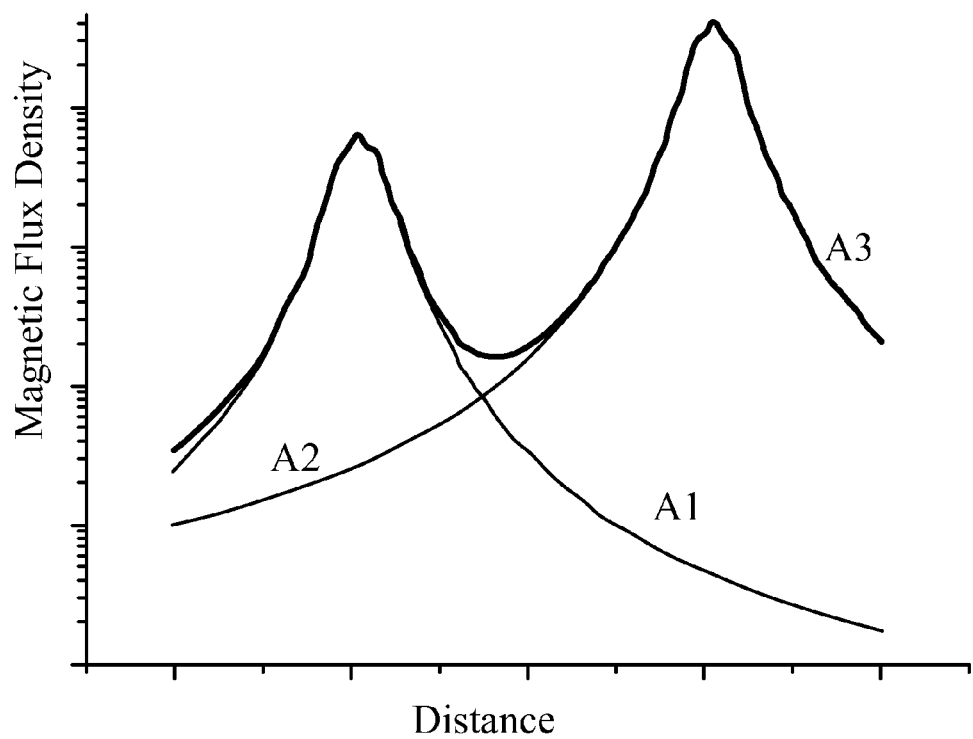
FIG. 2 is a schematic diagram showing the magnetic field strength distribution in the present invention.

Referring to FIG. 2, Curve A1 shown in FIG. 2 represents the magnetic field strength distribution measured along the vertical direction in a case where a single magnetic source (e.g., the lower magnetic source in FIG. 1) is deployed, and Curve A2 shown in FIG. 2 represents the magnetic field strength distribution established in a case where only the upper magnetic source (generating a stronger magnetic field) in FIG. 1 is deployed. When both of the upper and the lower magnetic sources are deployed, the resultant magnetic field strength distribution is represented by Curve A3.

As can be seen from above experimental results, a specific magnetic field strength distribution can be established by arranging plural magnetic sources along the direction in which the level of the liquid rises and falls, in which the magnetic fields generated by the respective magnetic sources are different from one another. Therefore, the actual liquid level can be estimated according to a measuring signal outputted by the magnetic detecting unit 14 in accordance with the magnetic field strength detected at the height at which the magnetic detecting unit 14 is located.

Specifically speaking, in the case that the magnetic detecting unit 14 has a single magnetic detecting element 15 (that is, only one magnetic detecting element 15 is deployed), the actual liquid level can be estimated by recording and tracking the magnetic field strengths continuously detected by the magnetic detecting element 15. For instance, in a situation that the liquid level only can move upward (or only can move downward), the liquid level at which the magnetic detecting element 15 is currently located can be estimated by using the crests and troughs which have been encountered in the magnetic field strength distribution. For example, when the data of the detected magnetic field strengths shows that the magnetic detecting element 15 has passed the first crest but has not reached the first trough (see FIG. 2) during which the magnetic detecting element 15 rises up, the magnetic field strength distribution between the first crest and the first trough can be used to estimate the current liquid level of the magnetic detecting element 15.

In the case where the magnetic detecting unit 14 has two or more than two magnetic detecting elements 15, the two magnetic field strengths simultaneously detected by the two magnetic detecting elements 15 may differ from each other since the two magnetic detecting elements 15, arranged along the direction in which the liquid rises and falls, are apart from each other for a predetermined distance. Therefore, calculating the difference between the two magnetic field strengths simultaneously detected by the two magnetic detecting elements 15 can determine whether the two magnetic detecting elements 15 are in the form of rising or in the form of falling. For example, as shown in FIG. 2, assuming that the two magnetic detecting elements 15 are at the height corresponding to the first trough after tracking and recording the detected magnetic field strengths, it can be determined that the two magnetic detecting elements 15 rise up some time later if the difference between the two detected magnetic field strengths is a positive value, and it can be determined that the two magnetic detecting elements 15 fall down some time later if the difference between the two detected magnetic field strengths is a negative value. Therefore, no matter which direction the liquid moves along, the actual liquid level can be accurately acquired by recording and tracking the magnetic field strengths continuously detected by the two magnetic detecting elements 15 and calculating the difference therebetween.

In addition, the measuring signals of the magnetic detecting unit 14 can be outputted to an estimating device (not shown) via an electric cable or by wireless communication, and the liquid level is determined by the estimating device. If the magnetic sources 16 are electromagnets, the electromagnets can be connected to a battery (not shown) or a power supply via power lines for supplying the electromagnets with electric power.

Figure 3:
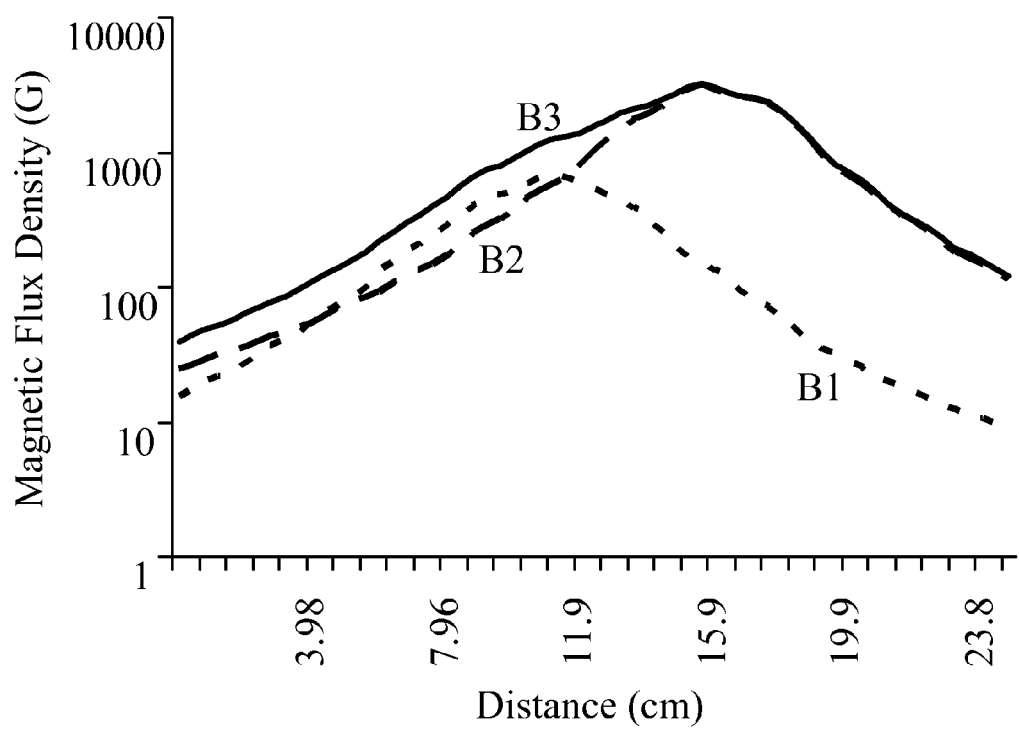
FIG. 3 shows the magnetic field strength distribution in accordance with an experimental result.

Furthermore, as can be seen from FIG. 3, by altering the distance between the two magnetic sources 16 and the magnetic fields correspondingly generated by the respective magnetic sources 16, the detected magnetic field strengths within a certain range may be approximate to a linear distribution. Curve B1 represents the magnetic field strength distribution measured along the vertical direction in a case where only one magnetic source is deployed. Curve B2 represents the magnetic field strength distribution measured along the vertical direction in a case where another magnetic source generating a stronger magnetic field is deployed alone. Curve B3 represents the resultant magnetic field strength distribution when both of the magnetic sources corresponding to Curves B1 and B2 are deployed. As shown in FIG. 3, within the range from the vertex shown in Curve B3 to the left side thereof, a one-to-one correspondence (or a fixed proportion) exists between the magnetic field strength and the liquid level. Accordingly, a current liquid level can be obtained as long as the magnetic field strength in this range is detected. Also, this range can be set as a liquid level measurement range.

Figure 4:
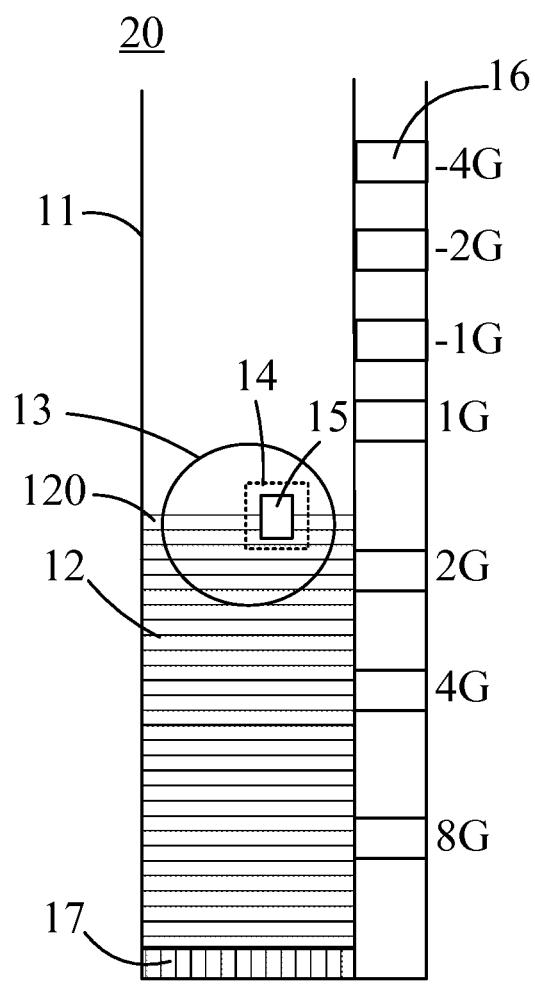
FIG. 4 is a schematic diagram showing a liquid level measuring device implemented according to an embodiment of the present invention.

The magnetic field strength distribution corresponding to the deployment of two magnetic sources is illustrated in Curve B3 of FIG. 3. On this basis, adding another magnetic source and appropriately selecting a magnetic field intensity correspondingly formed by this magnetic source and intervals between this magnetic source and other magnetic sources may establish another section of linear magnetic field strength distribution. In one embodiment, as shown in FIG. 4, the liquid level measuring device 20 uses a plurality of magnetic sources 16, and the magnetic field intensities corresponding thereto respectively are 8 G, 4 G 2 G, 1 G, −1 G, −2 G, and −4 G from top to bottom, in which the negative sign represents an opposite polarity. These magnetic sources 16 are distributed separately at irregular intervals along the changing direction of the liquid level and generate position-encoded magnetic fields. Within the liquid level measuring range, a linear magnetic field strength distribution can be established by arranging the magnetic field intensities corresponding to these magnetic sources 16 and intervals therebetween. As shown in the deployment in FIG. 4, only one magnetic detecting element 15 is needed since a one-to-one correspondence exists between the magnetic strength and the liquid level.

Figure 5:
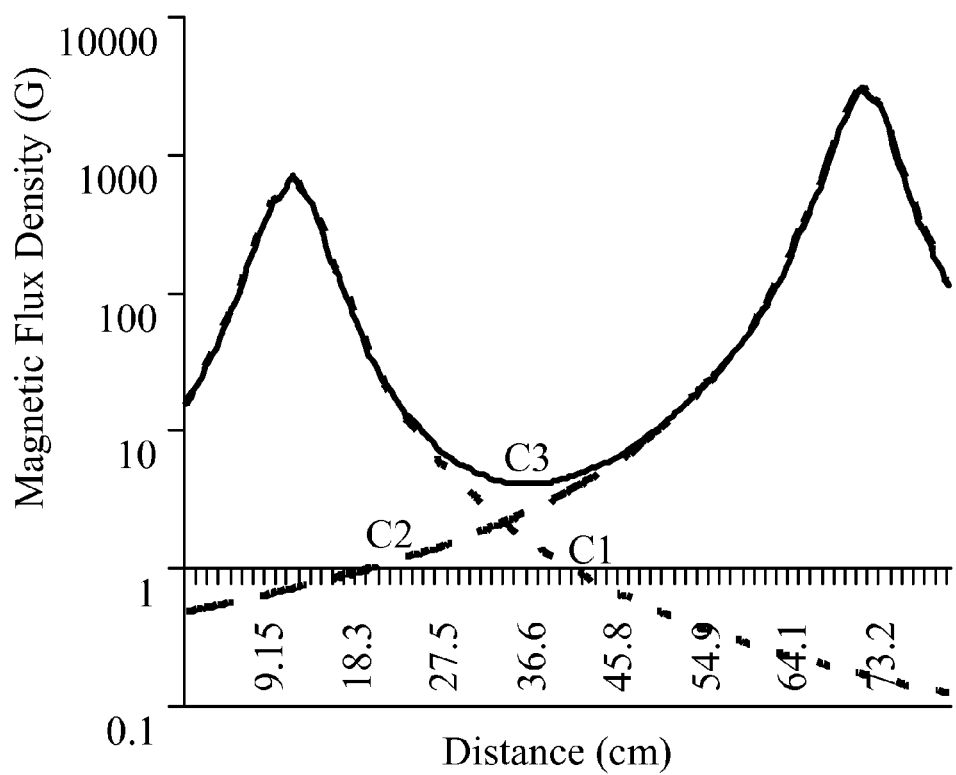
FIG. 5 shows the magnetic field strength distribution in accordance with another experimental result.

As shown in the experimental results in FIG. 5, the resultant magnetic field strength distribution (i.e., Curve C3) has clear crests and troughs (Curve C1 represents the magnetic field strength distribution in a case where only one magnetic source is deployed, and Curve C2 represents the magnetic field strength distribution in a case where another magnetic source generating a stronger magnetic field is deployed alone). Meanwhile, adopting only one magnetic detecting element is merely applicable to the situation in which the liquid level successively rises up (or successively falls down). When two or more than two magnetic detecting elements are adopted, the actual liquid level can be estimated according to the measuring signals outputted by these magnetic detecting elements, no matter which direction the liquid moves along during the measurement.

Figure 6:
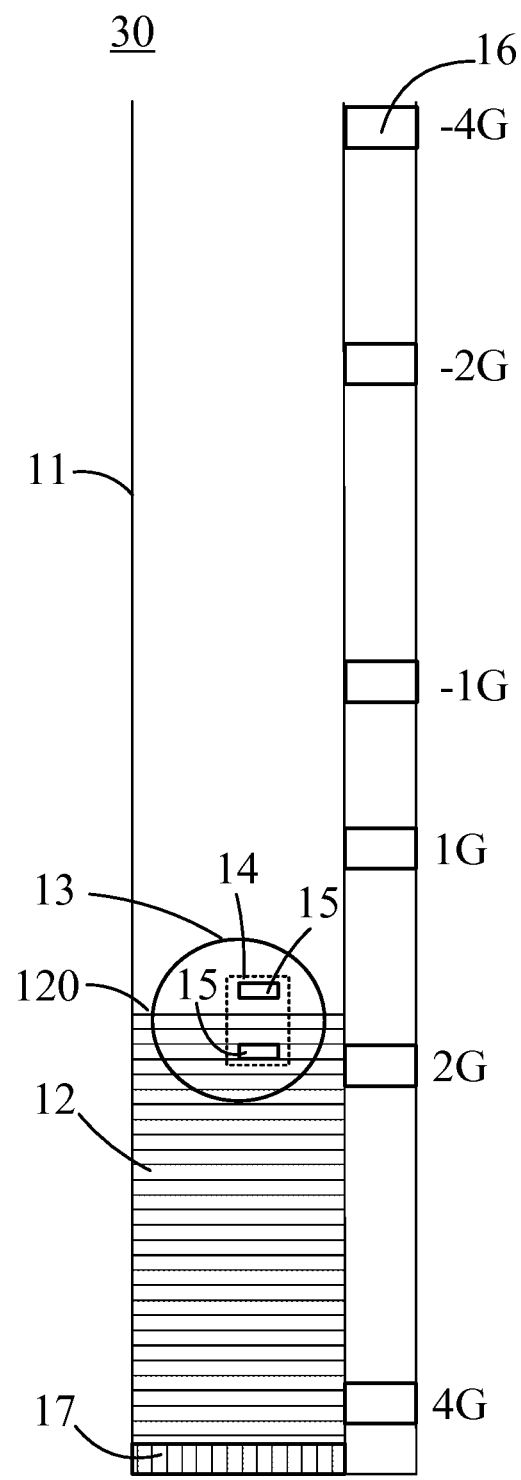
FIG. 6 is a schematic diagram showing a liquid level measuring device implemented according to another embodiment of the present invention.

In another embodiment, as shown in FIG. 6, the liquid level measuring device 30 uses a plurality of magnetic sources 16, and their magnetic field intensities are similar to that of the magnetic sources 16 of the liquid level measuring device 20 shown in FIG. 4. The magnetic field intensities corresponding to the magnetic sources 16 in FIG. 6 respectively are 4 G, 2 G, 1 G, −1 G, −2 G, and −4 G from top to bottom. The arrangement of the intervals between the magnetic sources 16 in FIG. 6 is different from that in FIG. 4. The established magnetic field strength distribution corresponding to the deployment in FIG. 6 has crests and troughs (similar to FIG. 5) and is encoded with the position information. In this embodiment, two magnetic detecting elements 15 are adopted to measure the magnetic strength, and the two magnetic detecting elements 15 are apart from each other for a predetermined distance along the vertical direction. By adjusting the predetermined distance, a better measuring result may be acquired. It is not intended to limit the number of the magnetic detecting elements 15 to one or two entities in the present invention. In principle, adopting more magnetic detecting elements 15 can output more measuring signals to compare with the magnetic field strength distribution established by the magnetic sources 16, and therefore a better measuring result may be obtained when more magnetic detecting elements 15 are adopted.

In addition, the liquid level measuring device of the present invention may further comprise a filter 17 (as shown in FIG. 4 and FIG. 6), which is arranged on the bottom surface of the tube 11. The liquid may enter the tube 11 via the filter 17. The filter 17 is used to filter the solid matter existing in the liquid so as to prevent the solid matter from entering the tube 11. In such a manner, the liquid level measuring device is suitable for being deployed in a river or in an area which is easily flooded.

The present invention can realize a liquid level measurement by using one or more magnetic detecting elements fastened to the floating member to detect the magnetic field strength distribution established by the magnetic sources. The liquid level measuring device of the present invention can be deployed in a river, a reservoir, or in an area which is easily flooded. Such a device can monitor the liquid level in real time and provide a steady and reliable liquid level measurement. In the present invention, the liquid level measuring device also can be used to monitor the level of a liquid or water for industrial use, and is applicable to other technical fields as well. Compared to conventional skills, the liquid level measuring device implemented in accordance with the present invention has many advantages including low cost, simplicity, and it can easily be deployed in considerable amounts.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A liquid level measuring device, comprising:
  a tube for accommodating a liquid;
  a floating member disposed inside the tube, the floating member rising and falling as a level of the liquid in the tube varies;
  a magnetic detecting unit having at least one magnetic detecting element, the magnetic detecting element and the floating member being fastened to each other such that the magnetic detecting element floats along with the floating member; and
  a plurality of magnetic sources disposed outside the tube, the magnetic sources being distributed separately along a changing direction of the liquid level so as to establish a specific magnetic field strength distribution,
  wherein the magnetic detecting element detects a magnetic field strength at the liquid level at which the magnetic detecting element is located and outputs a measuring signal correspondingly, and the liquid level is determined according to the measuring signal outputted by the magnetic detecting element; and
  wherein a one-to-one correspondence exists between the magnetic field strength and the liquid level within a liquid level measurement range in the specific magnetic field strength distribution.

2. The liquid level measuring device according to claim 1, wherein intervals between the magnetic sources are designed such that the magnetic sources establish a position-encoded magnetic field.

3. The liquid level measuring device according to claim 1, wherein magnetic fields generated by the respective magnetic sources are designed such that a position-encoded magnetic field is established.

4. The liquid level measuring device according to claim 1, wherein the magnetic sources substantially line up along a straight line.

5. The liquid level measuring device according to claim 1, wherein the magnetic detecting unit has at least two magnetic detecting elements, the two magnetic detecting elements are apart from each other for a predetermined distance, and the liquid level is determined according to the measuring signals outputted by the two magnetic detecting elements.

6. The liquid level measuring device according to claim 1, wherein the magnetic detecting element comprises a Hall effect sensor.

7. The liquid level measuring device according to claim 1, wherein the tube is a square tube, the floating member is a sphere, and the side of the square tube in cross section is in consistent with the diameter of the sphere.

8. A liquid level measuring device, comprising:
   a tube;
   a filter disposed at a bottom surface of the tube, a liquid entering the tube via the filter, the filter being used to filter solid matter existing in the liquid so as to prevent the solid matter from entering the tube;
   a floating member disposed inside the tube, the floating member rising and falling as a level of the liquid in the tube varies;
   at least two magnetic detecting elements configured to be apart from each other for a predetermined distance, the two magnetic detecting elements being fastened to the floating member such that the two magnetic detecting elements float along with the floating member; and
   a plurality of magnetic sources disposed on an external wall of the tube, in which magnetic fields generated by the respective magnetic sources are not the same, intervals between the magnetic sources are not the same as well, and the magnetic sources are distributed separately along a changing direction of the liquid level so as to establish a specific magnetic field strength distribution,
   wherein the two magnetic detecting elements respectively detect magnetic field strengths at their positions and output measuring signals correspondingly, and the liquid level is determined according to the measuring signals outputted by the two magnetic detecting elements; and
   wherein a one-to-one correspondence exists between the magnetic field strength and the liquid level within a liquid level measurement range in the specific magnetic field strength distribution.

9. The liquid level measuring device according to claim 8, wherein the two magnetic detecting elements are arranged along a direction in which the liquid rises and falls.

10. The liquid level measuring device according to claim 8, wherein the two magnetic detecting elements comprise Hall effect sensors.

11. The liquid level measuring device according to claim 8, wherein the tube is a square tube, the floating member is a sphere, and a side of the square tube in cross section is in consistent with a diameter of the sphere.

* * * * *